Figure 1:
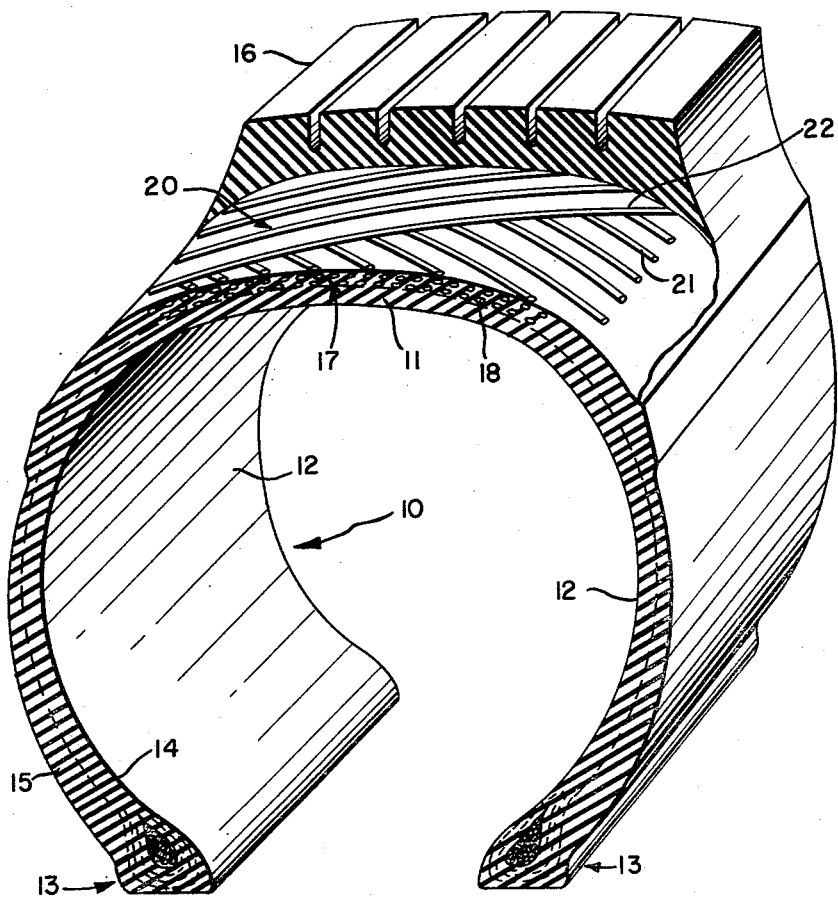

Jan. 19, 1965   R. L. KEEFE, JR   3,166,113
PNEUMATIC TIRE
Filed Jan. 8, 1963

INVENTOR
ROBERT L. KEEFE, JR.

BY David Katz
ATTORNEY

United States Patent Office 3,166,113
Patented Jan. 19, 1965

3,166,113
PNEUMATIC TIRE
Robert L. Keefe, Jr., Chadds Ford, Pa., assignor to E. I. du Pont de Nemours and Company, Wilmington, Del., a corporation of Delaware
Filed Jan. 8, 1963, Ser. No. 250,169
2 Claims. (Cl. 152—361)

This invention relates to pneumatic tires and, more particularly, to a pneumatic tire construction with a novel type of reinforcement lying essentially in the meridian planes of the tire.

In a pneumatic tire, the area of tread which is in moving contact with the road surface is subjected to wear due to the drag which accompanies movement in the lateral direction as well as movement in either the forward or the reverse direction. In the conventional pneumatic tire with bias cords in the carcass, the over-all wear is greater than the over-all wear in a belted tire, because the rigidity of the belt minimizes the drag that accompanies the forward and reverse movement. Such a belted tire with cords of the belt in parallel planes of which each form an angle less than 20° with the equatorial plane of the tire is shown by L. Emanueli et al. in U.S. Patent 2,982,328. However, wear due to the drag which accompanies movement in the lateral direction, such as occurs in cornering, is significant both in the conventional tire with bias cords and in the tire with a belt such as that of Emanueli et al. In an attempt to minimize wear due to the drag which resists movement in the lateral direction, as well as in either the forward or the reverse direction, Bourdon in U.S.P. 2,493,614 proposes a pneumatic tire with a belt made of several reinforced sheets, each sheet being made up of metal wires embedded inside a rubber layer, the wires running in different directions in any three adjacent sheets, so that the three directions jointly form a triangle. However, Bourdon's teachings require that the wires be substantially non-extensible. Accordingly, his construction is rigid and leads to an uncomfortable ride. Furthermore, it is well known that shoulder failures are common in tires having belts of steel reinforcement members.

This invention has as an object to provide a tire with a longer service life, lower tread wear and high cornering stiffness.

Other objects and achievements of this invention will appear as the description proceeds.

According to this invention, the above objects are achieved by providing a pneumatic tire with a crosswise compression-resistant, circumferentially extensible reinforcement strap disposed in the crown region of the tire. By crosswise here, is meant crosswise of the equatorial plane of the tire. In a bias-carcass tire, the said reinforcement strap is located over the carcass and under the tire tread; and in a belted tire, it is located over the belt and under the tire tread. In either case, said strap contains elastomer embedded, lengthwise extensible, pliable cord-like elements disposed at an angle of not less than 70° to the equatorial plane of the tire.

It will be noted from the above that the reinforcement strap of this invention resembles essentially the conventional belt, both in its circumferential dimension and in its location in the tire structure. It is distinguished from such a belt, however, both in its purpose, physical properties and structure. Thus, the customary belt contains metal wires running circumferentially of the tire and is essentially inexpansible in that dimension. In the strap of this invention the cord-like elements are of pliable textile material and are disposed very nearly at right angles to the equatorial plane. The strap as a whole is yielding (expansible) circumferentially, but offers resistance to compression crosswise of the equatorial plane.

The cord-like elements used in the strap of this invention are not cords in the strict sense of the word; that is, they are not made up of twisted filaments like ordinary cord or yarn. Instead, they are textile monofils as obtained for instance directly in melt-extrusion of synthetic textile polymers (say, polyamides or polyesters). They are however of substantial thickness, having a denier of not less than 200. The strap as a whole may be either in one layer with the compression-resistant, extensible reinforcement cord element making a 90° angle with the equatorial plane of the tire, or it may be made out in pairs of layers arranged either concentrically or spirally, and the compression-resistant, extensible reinforcement elements in adjacent layers taking opposite, i.e. divergent, directions with respect to the equatorial plane.

The strap is formed of lengthwise extensible reinforcement cord elements laid out in parallel relation in elastomer skim stock, and it is applied to the expanded carcass. The strap should be of a width no greater than the inside width of the tire cross-section and no less than 75% of the width of the tread.

Figure 2:
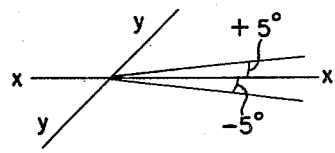

For a further understanding of this invention, reference is now made to the accompanying drawing, in which FIG. 1 represents a vertical section of a tire extended rearwards in perspective, to illustrate an embodiment of this invention as applied to a belted tire, while FIG. 2 is an orientation diagram representing a pair of rectangular coordinates in a horizontal phase, the y-axis being oriented in the same direction as the tangent to the equatorial circle of the tire at its highest point.

In FIG. 1, 10 is the tire carcass in general, having a crown region 11, side wall regions 12, bead portions 13, and consisting of cord-reinforced plies 14. The carcass is surrounded by an outside rubber shell 15, which is continuous with the tread 16. On top of the crown region 11 of the carcass lies a conventional belt 17, whose assembly of parallel reinforcing elements 18 runs circumferentially of the tire and appears through their sections in the front plane of the figure. The tread covering has been ripped away in the foreground portion of the crown region in the figure, for the sake of exposing the strap structure 20 of this invention. In the particular embodiment of this figure, said strap structure comprises two layers of elastomer embedded monofils. The elastomer filling being omitted for clearness, monofils 22 indicate the upper layer and are disposed at an angle of about +5° to a horizontal reference line x indicated in FIG. 2, while monofils 21 represent the lower layer and are disposed at an angle of about —5° with reference to the same axis. (This gives each layer a crown angle, as defined below, of 85°.)

The entire composite structure of elastomer embedded cords makes a complete circle around the expanded tire, at a radial location above the outer periphery of the carcass and just below the tread of the tire.

The mode of manufacturing the strap of this invention is similar to that of manufacturing the conventional cord-reinforced ply, except that monofil elements instead of cords are used for the strap. The mode of building the tire itself likewise follows in its essence conventional procedure (see for instance, U.S.P. 2,814,331), and is further illustrated in the first two paragraphs of Example I hereinbelow.

Tires constructed according to this invention possess a longer service life, a lower rate of tread wear, and a greater lateral stability (high cornering stiffness) because of minimum wear at the shoulder area. They also possess a greater riding comfort than tires which possess a conventional belt in lieu of the strap of this invention.

In the examples below are recorded the results of actual tests on tires constructed according to this invention insofar as properties which can be numerically expressed are concerned (e.g. rate of tread wear). The technical terms and measurable magnitudes employed in these examples are to be understood or to be derived as follows:

The crown angle is the acute angle made between the direction of the cords at the crown and the tangent to the crown (equatorial circle) at that point. The equatorial plane is the plane, perpendicular to the tire's axis of rotation, which divides the tire into equal halves. A radial or meridian plane is any plane which includes the tire's axis of rotation.

All the tires of the following examples were built without expansion into the curing mold to avoid lateral contraction of either the belt or the breaker. The tires were tested at high speeds (60 m.p.h.) on curving roads.

The average over-all wear for a specially low-profile tire having 7 ribs of equal width is equal to $$\frac{1.5 \text{ (shoulder wear)} + \text{riding rib wear} + \text{center wear}}{3.5}$$

The average wear for a medium-low-profile tire having 6 ribs of equal width is equal to $$\frac{1.5 \text{ (shoulder wear)} + \text{riding rib wear} + 0.5 \text{ (center wear)}}{3.0}$$

The 8.50–14 specially low-profile tire of Example II was made in a mold with a maximum mold section width of 8.2" and a mold section height, measured from the flat of the heel to the point of maximum mold radius, of 5.3". The 7.50–14 medium-low-profile tire of Example I was made in a mold with this width of 7.6" and this height of 5.7".

EXAMPLE I

Two pairs of 7.50–14 medium-low-profile tires were constructed with a conventional carcass of two plies, each ply containing substantially parallel polyamide cords disposed at a crown angle of approximately 30°, the cords in one ply being divergent in direction with respect to the cords in the other ply.

The carcasses for two of these tires were expanded so that the midline at the crown of the carcass described a circle of 76½" in circumference, and then, on this midline of each of these two carcasses, was centered a strap, 5¼" wide, of two layers containing meridian reinforcements of 1600 denier polyamide monofils. The monofils, parallel to each other in each layer and located at an angle of 85° with respect to the equatorial plane of the expanded carcass, were divergent to the monofils in the other layer. The elastomeric tread and sidewall shell was then placed on each carcass over the strap, and finally each assembly was shaped into an uncured tire.

To each of the expanded carcasses of the other two tires was applied an elastomeric tread and sidewall shell, and the two assemblies were expanded and shaped into uncured tires.

The tread for all four tires was 4⅞" wide. Except for the preliminary expansion, the four tires were conventionally cured in a conventional press and then were wear-tested for approximately 12,000 miles, determining the wear at 1000 mile intervals. Each pair of tires was tested under identical conditions and the results are given in Table 1. The data in this table represent the wear as computed by the cumulative method. In this method, the total tread depth loss during the test, in mils, is divided by the total test mileage and then multiplied by 10,000 to express the loss in terms of mils per 10,000 miles.

Table 1

|  | Shoulder Wear | Riding Rib Wear | Center Wear | Avg. Wear |
|---|---|---|---|---|
| Pair of tires without compression-resistant meridian reinforcement | 86 | 83 | 85 | 85 |
|  | 93 | 90 | 91 | 92 |
| Pair of tires with compression-resistant meridian reinforcement | 66 | 79 | 96 | 75 |
|  | 54 | 80 | 81 | 67 |

The grand average of wear by the pair without the meridian reinforcement was 88 mils, and the grand average of wear by the pair with the meridian reinforcement was 71 mils. However, the average of wear at the shoulder area by the pair without the meridian reinforcement was 89 mils, and the average of wear at the shoulder area by the pair having the meridian reinforcement was only 60 mils, which is less than the wear at the other areas of the same tire.

The wear in the above experiment was also computed by the so-called slope method, but the data did not differ by much from those above tabulated.

EXAMPLE II

Two pairs of 8.50–14 specially low-profile, radial carcass belted tires were constructed, each having a carcass of parallel polyamide cords located in planes approximately parallel with the meridian planes of the tire and with a two-ply belt constructed of parallel 840/3/2 polyamide cords located in planes which make a 15° angle with the equatorial plane of the tire.

Two of said tires had superimposed on the belt a strap, 6½" wide, containing compression-resistant cord elements of 1600 denier polyamide monofils, these elements describing an angle of 85° with the equatorial plane of the tire. The other two belted tires were left without straps and therefore served as controls for the test applied.

The tread for all four tires was 5½" wide. They were then cured in a conventional press and wear-tested for 10,000 miles.

The grand average wear for the control tires was 83 mils. For the tires with polyamide compression-resistant members, the average wear was found to be 65 mils.

In a similar experiment involving four tires of which two had median straps with reinforcement elements made of twisted cord (viscose rayon of 1650 denier) instead of monofils, the wear test showed barely any difference between the strapped tires and the controls, the grand average in either case being of the order of 160 mils per 10,000 miles.

In all the tests of the aforegoing examples, the tires were inflated to 30 p.s.i. and were loaded to 1085 pounds in Example I, and to 1160 pounds in Example II. They were tested in pairs on the same automobile axle so that the wear equalizations which normally occur between axle pairs would not influence the over-all test results.

The compression-resistant reinforcement elements for this invention may be textile monofils of polyamides, polyesters, cellulose esters or ethers, regenerated cellulose, vinyl polymers, acrylic polymers, or hydrocarbon polymers.

With a strap according to this invention, a bias carcass tire now has both the superior lateral stability inherent to the bias construction of its carcass plies as well as the superior low tread wear that is given by a belted tire. Furthermore, with this invention the belted tire now has both low tread wear and better cornering characteristics due to its improved lateral stability.

An important advantage of this invention for a truck tire is the greater efficiency in power utilization attained by the truck, because of the significant lessening of the drag which accompanies movements in the lateral direction. Therefore, this invention gives the truck user both lower fuel cost and lower tire cost.

In addition to the fabrication of new tires for automobiles and trucks, this invention can also be used in the retreading of tires for automobiles and trucks, because, after the old tread is removed, either a belt, or a strap, or a belt and strap together, may be applied to the already fully expanded carcass.

Many additional modifications of this invention will be apparent to those skilled in the art, and it is to be understood that this invention is not to be limited to the specific embodiments thereof except as defined in the appended claims.

I claim as my invention:

1. In a pneumatic tire comprising a carcass made up of cord-reinforced plies and a ground-contacting tread portion on the outer periphery of said carcass, a reinforcing strap disposed above the outer periphery of said carcass and underneath said tread, said strap extending circumferentially in a complete circle around the tire and extending laterally for a width not less than the width of said tread and not greater than the inner diameter of the tire cross-section, said strap comprising an endless ribbon of elastomeric material having embedded therein a multiplicity of discrete, parallel cord-like elements extending essentially for the full width thereof and at an angle of not less than 70° to the equatorial plane of the tire, each of said cord-like elements being a monofil of a melt-extrudible synthetic textile polymer and having the properties of both extensibility and compressibility in the direction of its length, whereby said strap as a whole endows the tire with a circumferential reinforcement having extensibility and compressibility in the direction transverse to the equatorial plane of the tire.

2. A pneumatic tire as defined in claim 1 and containing a strap as there defined, said tire containing further a circular belt of elastomeric material disposed around the outer periphery of the tire carcass and containing metallic reinforcing strands running lengthwise of said periphery, said belt being disposed between said straps and the carcass of said tire.

References Cited in the file of this patent

UNITED STATES PATENTS

| | | |
|---|---|---|
| 2,317,911 | Hoff | Apr. 27, 1943 |
| 2,826,233 | Cooper | Mar. 11, 1958 |
| 2,976,905 | Beckadolph | Mar. 28, 1961 |

FOREIGN PATENTS

| | | |
|---|---|---|
| 747,686 | Great Britain | Apr. 11, 1956 |